Figure 1:
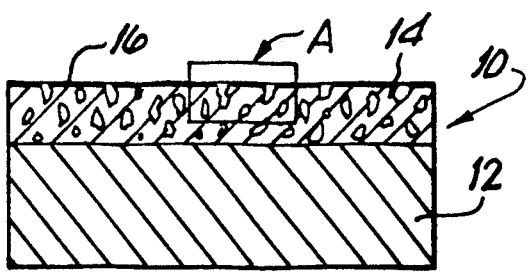
Figure 2A:
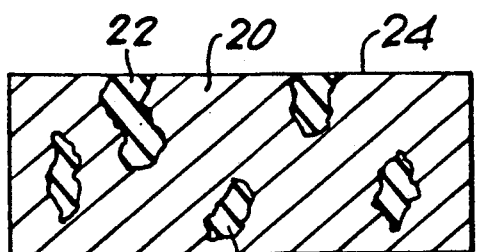
Figure 2B:
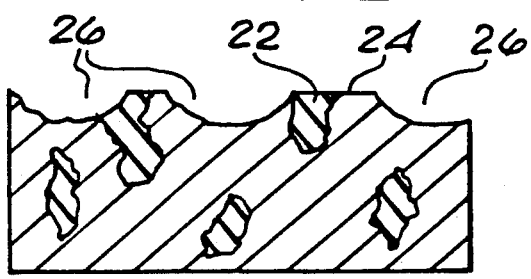
Figure 2C:
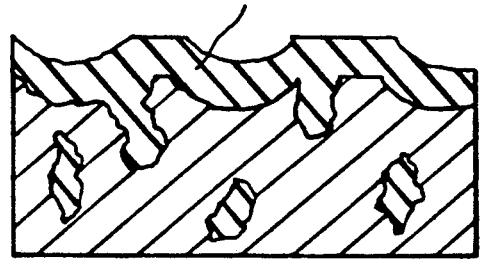
Figure 2D:
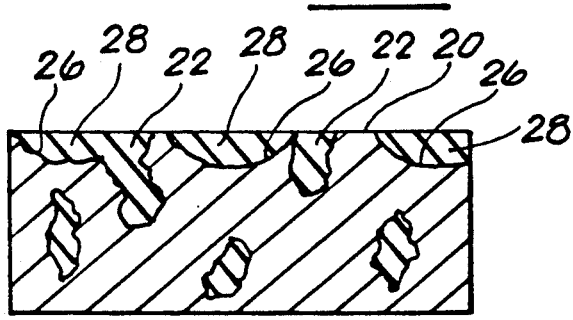
Figure 2E:
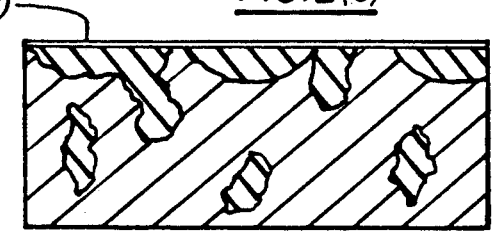
Figure 2F:
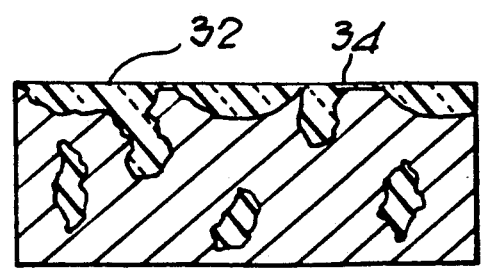

United States Patent [19]
Green

[11] Patent Number: 5,195,244
[45] Date of Patent: Mar. 23, 1993

[54] BEARINGS

[75] Inventor: Donald Green, Cumbria, England

[73] Assignee: Vandervell Limited, Maidenhead, England

[21] Appl. No.: 626,018

[22] Filed: Dec. 12, 1990

[30] Foreign Application Priority Data

Dec. 22, 1989 [GB] United Kingdom ............... 8929142

[51] Int. Cl.⁵ .............................. B21D 53/10
[52] U.S. Cl. ............... 29/898.12; 29/898.06; 29/898.13; 29/898.14
[58] Field of Search ............ 29/898.047, 898.06, 29/898.12, 898.13, 898.14, 527.1, 527.2, 530, 90.7

[56] References Cited

U.S. PATENT DOCUMENTS

| | | | |
|---|---|---|---|
| 2,266,320 | 12/1941 | Hobbs | 29/898.12 X |
| 2,288,656 | 7/1942 | Smart | 29/898.14 X |
| 2,373,352 | 4/1945 | Smart | 29/898.12 X |
| 2,465,329 | 3/1949 | Murray | 29/898.14 X |
| 2,520,310 | 8/1950 | Frazier et al. | 29/898.14 X |
| 2,585,430 | 2/1952 | Boegehold | 29/898.12 X |
| 2,995,462 | 8/1961 | Mitchell et al. | 29/898.12 X |
| 3,142,559 | 7/1964 | Ruff et al. | 29/898.12 X |
| 3,445,909 | 5/1969 | Beebe, Jr. | 29/898.12 |
| 4,718,155 | 1/1988 | Warriner et al. | 29/898.12 |

Primary Examiner—Timothy V. Eley
Assistant Examiner—C. Richard Martin
Attorney, Agent, or Firm—William R. Hinds

[57] ABSTRACT

Bearings and a method of manufacture thereof are described, the method comprising the steps of forming a half bearing of a desired size from a leaded bronze alloy having a strong backing material, indenting the bore surface of the leaded bronze alloy, depositing a layer of a lead-based overlay material onto the indented bore surface, depositing a layer of indium onto the lead-based overlay material surface and heat treating to diffuse the indium at least into the lead-based overlay material.

10 Claims, 2 Drawing Sheets

BEARINGS

The present invention relates to bearings having a strong backing material such as steel, a layer of a lead containing copper-based bearing alloy bonded to the backing and a layer of a soft, indium containing lead based overlay alloy on the bearing alloy.

U.S. Pat. No. 4,400,099 describes a bearing having a surface provided with a continuous helical groove which is filled with a soft overlay material. The resulting composite surface consists of bands of a harder bearing material alternating with bands of a softer overlay material which provides a capacity for dirt embeddability. The described bearing, however, also has a hard interlayer of, for example, a nickel-based material interposed between the bearing material and the overlay. There is some evidence to suggest that this interlayer increases the possibility of seizure on being exposed due to overlay wear. In the bearing described the edges of the interlayer are continuously exposed because of the geometrical constitution of the bearing.

In U.S. Pat. No. 4,718,155 a randomly indented surface is described, the surface being overlay plated and machined to provide a uniform running surface. The preferred embodiments of this bearing again has a harder interlayer of, for example, nickel but owing to the randomly indented surface, exposure, as a result of overlay wear, produces a discontinuous, randomly shaped area of interlayer which has been found to be superior to other known bearings.

It is, however, considered by the present applicants that complete omission of the interlayer is a desirable objective, especially in highly loaded bearings.

According to a first aspect of the present invention a method of making a sliding bearing comprises the steps of forming a half bearing of a desired size from a leaded bronze alloy having a strong backing material, indenting the bore surface of the leaded bronze alloy to an indentation-depth between 0.01 and 0.25 mm by knurling, depositing a layer of a lead-based overlay material onto the indented bore surface, depositing a layer of indium onto the lead-based overlay material surface and heat treating to diffuse the indium at least into the lead-based overlay material.

The leaded-bronze bearing substrate alloy may be chosen from the class of copper based alloys generally comprising from 0.5 to 10 wt % of tin and from 10 to 35 wt % of lead.

The leaded-bronze substrate alloy may be either sintered or cast.

The strong backing material may be steel, for example.

According to other aspects of the present invention, the surface of the leaded bronze substrate alloy may be indented by any known methods, such methods including, for example, shot peening, indenting by knurling, machining of pits or grooves. The depth of the indentations may lie in the range 0.010–0.25 mm.

The overlay alloy is formed preferably by first electro-depositing a layer of a lead-based material, such as substantially pure lead onto the indented surface, machining, which may include any suitable method such as turning or broaching, to a desired bore size, electro-depositing a thin layer of indium onto the lead-based material and then heat treating to diffuse the indium into at least the lead based overlay material.

Where the bore is machined or broached prior to deposition of the indium layer the final depth of the indentations may be substantially less than originally applied.

It is possible to deposit the indium layer prior to machining of the lead layer, the bearing is then heat treated to diffuse the indium into the overlay which is finally machined back to the desired bore size. It is felt, however, that whilst this is perfectly feasible and a practical technical option it is nevertheless economically undesirable in that it is wasteful of the expensive element, indium.

An advantage of the bearing of the present invention is where the indium is not only diffused into the overlay material to enhance corrosion resistance but also into the leaded bronze including the lead phase lying adjacent the surface. Therefore, even when the overlay is worn through, exposing the underlying leaded bronze, corrosion of the lead phase is controlled by the presence of indium in the lead pools adjacent the surface. A tribologically beneficial copper indium intermetallic is also formed in the bronze matrix adjacent the surface.

Also according to the invention a method of making a sliding bearing comprises the steps of forming a half bearing of a desired size from a leaded bronze alloy having a strong backing material, the leaded bronze alloy containing from 0.5 to 10 weight percent of tin and from 10 to 35 weight percent of lead, indenting the bore surface of the leaded bronze alloy to an indentation depth between 0.01 and 0.25 mm, depositing a layer of a lead-based overlay material onto the indented bore surface, machining the surface of the lead-based overlay material sufficiently to expose at least some areas of said leaded bronze alloy about the indentations, depositing a layer of indium onto the lead-based overlay material surface and heat treating to diffuse the indium at least into the lead-based overlay material and the lead phase lying adjacent the surface of the leaded bronze alloy.

A method of making a sliding bearing in accordance with the invention also comprises the steps of forming a half bearing of a desired size from a leaded bronze alloy having a strong backing material, indenting the bore surface of the leaded bronze alloy to an indentation depth between 0.01 and 0.25 mm, depositing a layer of a lead-based overlay material onto the indented bore surface, depositing a layer of indium onto the lead-based overlay material surface and heat treating to diffuse the indium at least into the lead-based overlay material, wherein the surface of the lead-based overlay material is machined prior to deposition of the indium layer, and said machining is such as to leave a surface comprising exposed areas of original lead pools of said leaded bronze alloy, indentations filled with said lead-based overlay material, and bronze matrix of said leaded bronze alloy.

Figure 3A:
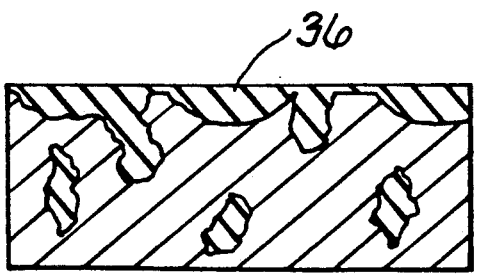
Figure 3B:
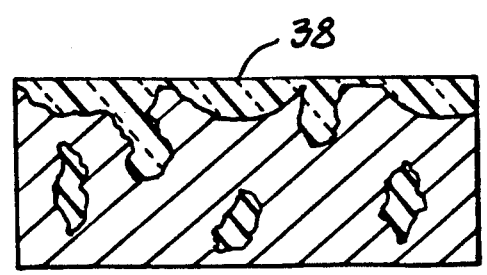
Figure 4:
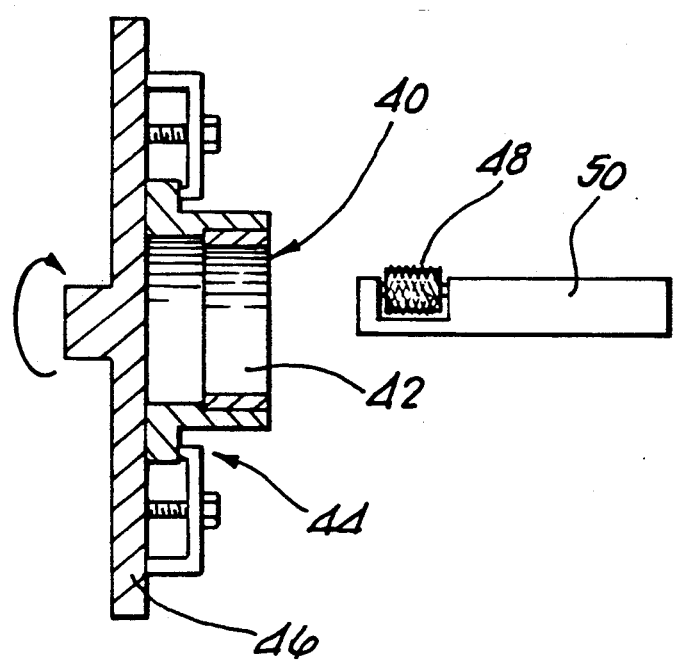

In order that the present invention may be more fully understood, examples will now be described by way of illustration only with reference to the accompanying drawings, of which:

FIG. 1 shows a schematic section through a bearing having a lining with an overlay produced by the method of the present invention;

FIGS. 2(a) to 2(f) show the detail 'A' of the lining of FIG. 1 and the steps to produce the overlay;

FIGS. 3(a) and 3(b) show an alternative overlay embodiment to FIGS. 2(a) to 2(f); and FIG. 4 which shows a schematic diagram of a bearing having indentations applied to the bore.

Referring now to FIG. 1, and FIGS. 2(a) to 2(f) and where the same features have common reference numerals.

A section of a bearing is shown generally at 10. The bearing comprises a steel backing 12 and a lining 14 of a leaded bronze bearing alloy having an overlay 16. A portion of the lining 14 and overlay 16 is shown in the detail box 'A'. The steps to produce the overlay 16 are depicted in FIGS. 2(a) to 2(f) and which show the portion in the box 'A' in various stages of processing.

The leaded bronze alloy comprises a bronze matrix 20 having lead pools 22 therein. The first stage of processing is to produce a smooth bore surface 24 wherein some of the lead pools 22 intersect the surface 24 (FIG. 2(a)). The surface 24 is then provided with indentations 26, in this instance, by knurling (FIG. 2(b)). The knurled surface is then electro-plated with a lead overlay coating 28 (FIG. 2(c)) which is then broached back to a desired bore dimension to leave a surface comprising the original lead pools 22 intersecting the surface, indentations 26 filled with lead overlay 28 and bronze matrix alloy 20 (FIG. 2(d)). A thin surface layer 30 of indium is then applied by electro deposition (FIG. 2(e)), the indium coated bearing then being heat treated for 1 hour at 140° C. to diffuse the indium into the surface to form a lead indium overlay alloy 32 and also form an intermetallic 34 with the indium (FIG. 2(f)).

FIGS. 3(a) and 3(b) show an alternative overlay where after deposition of the lead overlay coating 28 the bearing is broached back to leave a continuous lead layer 36 over the entire surface. After deposition of an indium layer (not shown) and subsequent diffusion heat treatment there is formed a lead-indium alloy 38 over the entire surface (FIG. 3(b)).

FIG. 4 shows schematically a pair of bearings 40 about to have a knurled finish applied to the bore 42. The bearings 40 are held in a clamping arrangement 44 mounted on a lathe faceplate 46 for rotation. A knurling tool 48 is mounted on a radially and axially moveable arm 50. A knurled surface is formed on the bore 42 which is then provided with an overlay as described with regard to the preceding figures.

In some circumstances it may be desirable to lightly machine the knurled surface prior to overlay deposition.

I claim:

1. A method of making a sliding bearing, the method comprising the steps of:
   forming a half bearing of a desired size from a leaded bronze alloy having a strong backing material,
   indenting the bore surface of the leaded bronze alloy to an indentation depth between 0.01 and 0.25 mm by knurling,
   depositing a layer of a lead-based overlay material onto the indented bore surface,
   depositing a layer of indium onto the lead-based overlay material surface and
   heat treating to diffuse the indium at least into the lead-based overlay material.

2. A method according to claim 1 wherein the surface of the lead-based overlay material is machined prior to deposition of the indium layer.

3. A method according to claim 2 wherein the leaded bronze alloy contains from 0.5 to 10 wt % of tin and from 10 to 35 wt % of lead.

4. A method according to claim 2 wherein said machining is such as to leave a surface comprising exposed areas of original lead pools of said leaded bronze alloy, indentations filled with said lead-based overlay material, and bronze matrix of said leaded bronze alloy.

5. A method according to claim 1 wherein the final bearing surface comprises a mixture of areas of indium-diffused lead based overlay and leaded bronze having indium diffused thereinto to form a copper indium intermetallic.

6. A method according to claim 1 wherein the final bearing surface comprises a continuous lead based overlay phase having indium diffused thereinto.

7. A method of making a sliding bearing, the method comprising the steps of:
   forming a half bearing of a desired size from a leaded bronze alloy having a strong backing material, the leaded bronze alloy containing from 0.5 to 10 weight percent of tin and from 10 to 35 weight percent of lead,
   indenting the bore surface of the leaded bronze alloy to an indentation depth between 0.01 and 0.25 mm,
   depositing a layer of a lead-based overlay material onto the indented bore surface,
   machining the surface of the lead-based overlay material sufficiently to expose at least some areas of said leaded bronze alloy about the indentations,
   depositing a layer of indium onto the lead-based overlay material surface and
   heat treating to diffuse the indium at least into the lead-based overlay material and the lead phase lying adjacent the surface of the leaded bronze alloy.

8. A method according to claim 7 wherein said indenting is by knurling.

9. A method according to claim 7 wherein the final bearing surface comprises a mixture of areas of indium-diffused lead based overlay and leaded bronze having indium diffused thereinto to form a copper indium metallic.

10. A method of making a sliding bearing, the method comprising the steps of:
   forming a half bearing of a desired size from a leaded bronze alloy having a strong backing material,
   indenting the bore surface of the leaded bronze alloy to an indentation depth between 0.01 and 0.25 mm,
   depositing a layer of a lead-based overlay material onto the indented bore surface,
   depositing a layer of indium onto the lead-based overlay material surface and
   heat treating to diffuse the indium at least into the lead-based overlay material,
   wherein the surface of the lead-based overlay material is machined prior to deposition of the indium layer, and said machining is such as to leave a surface comprising exposed areas of original lead pools of said leaded bronze alloy, indentations filled with said lead-based overlay material, and bronze matrix of said leaded bronze alloy.

* * * * *